Aug. 11, 1931.                W. F. GROENE                1,818,128
                             AUTOMATIC LATHE
                          Filed Aug. 12, 1926        9 Sheets-Sheet 5
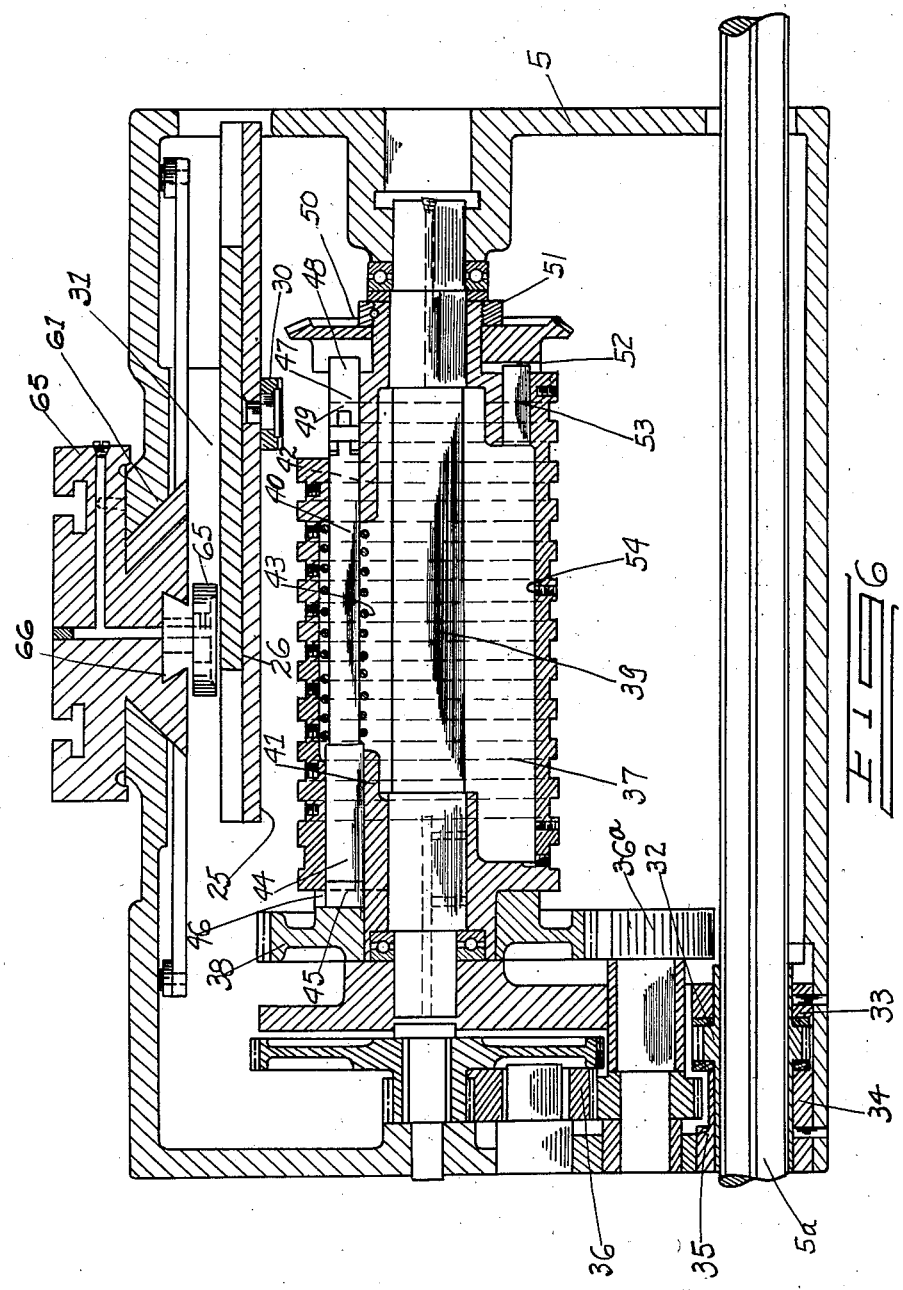
INVENTOR.
William F. Groene
BY
ATTORNEY.S

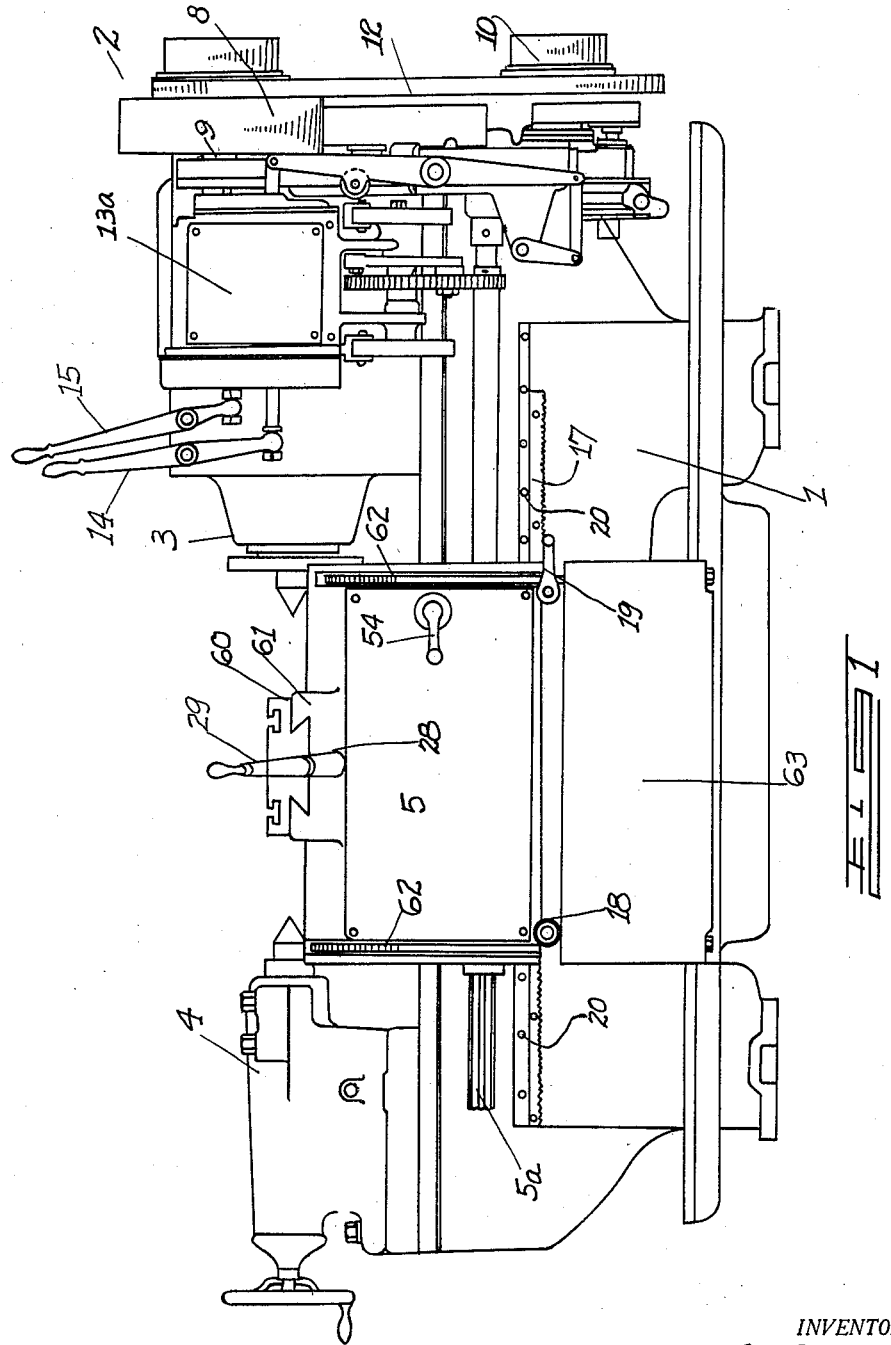

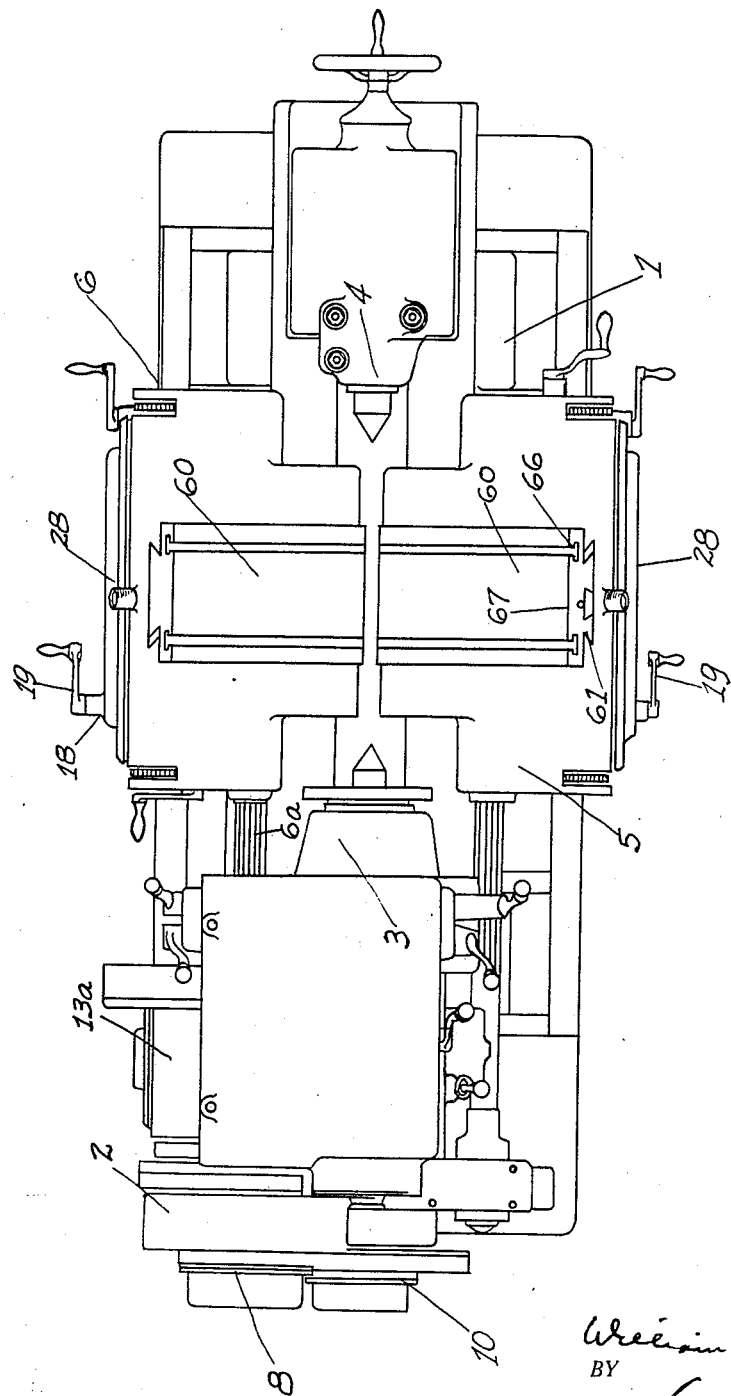

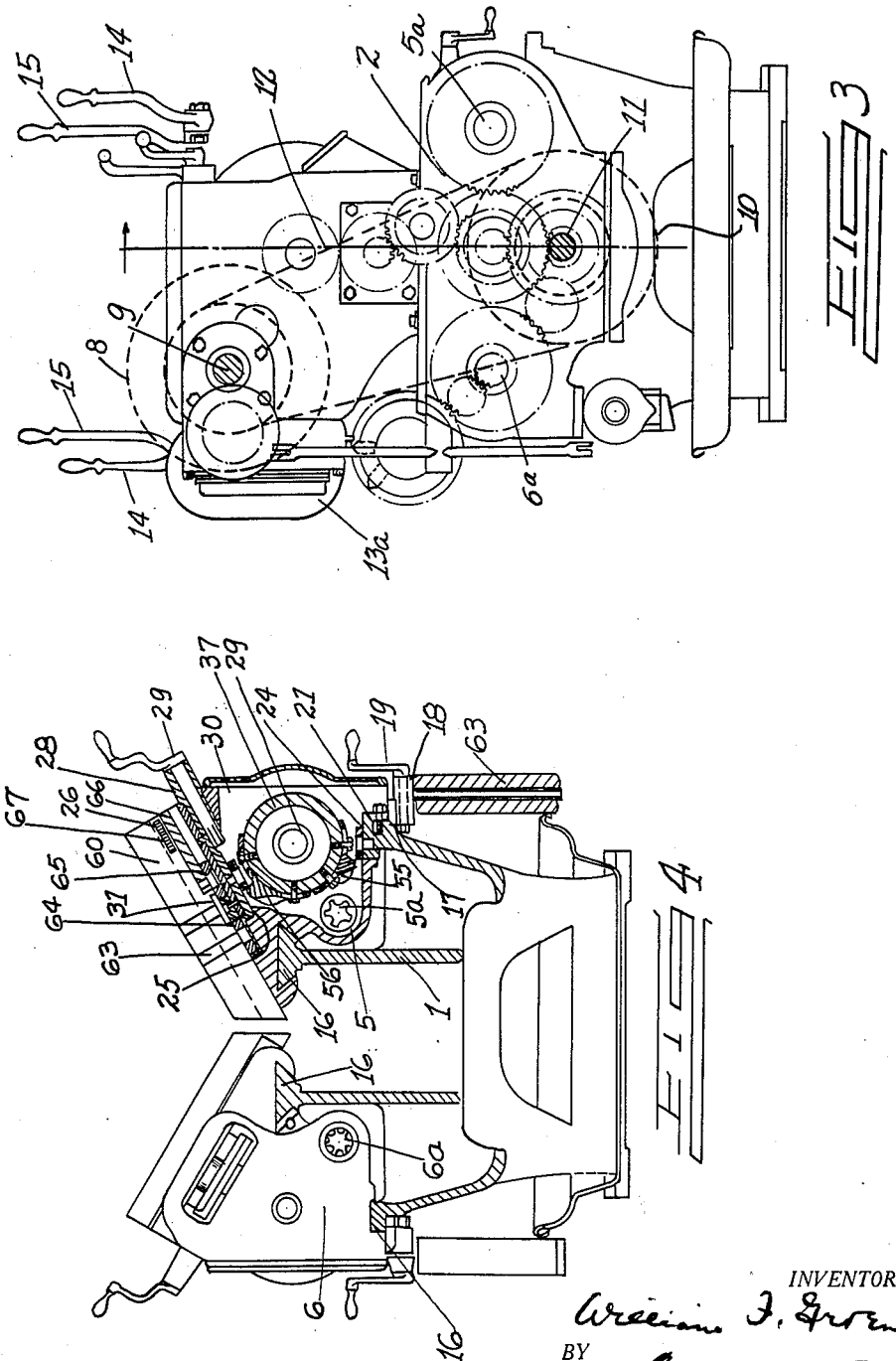

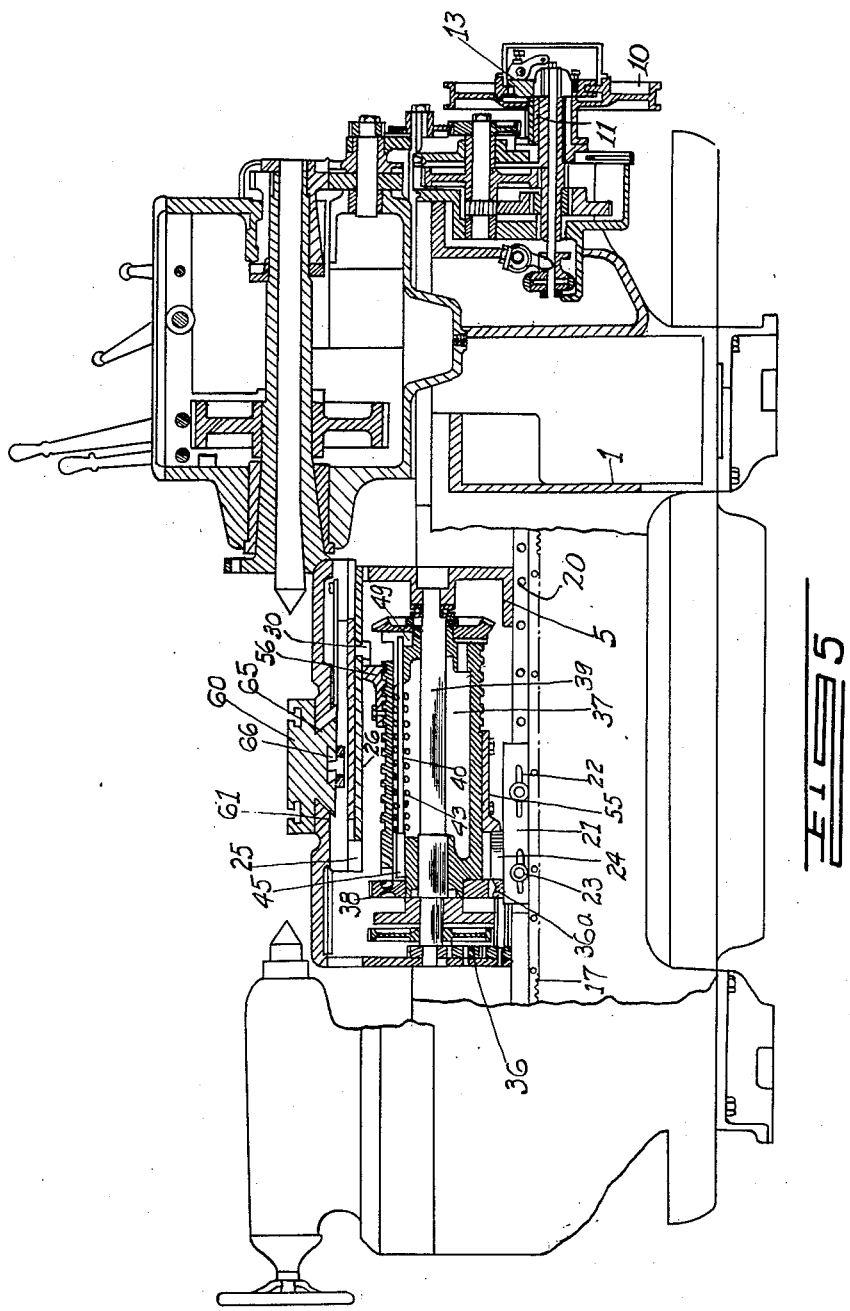

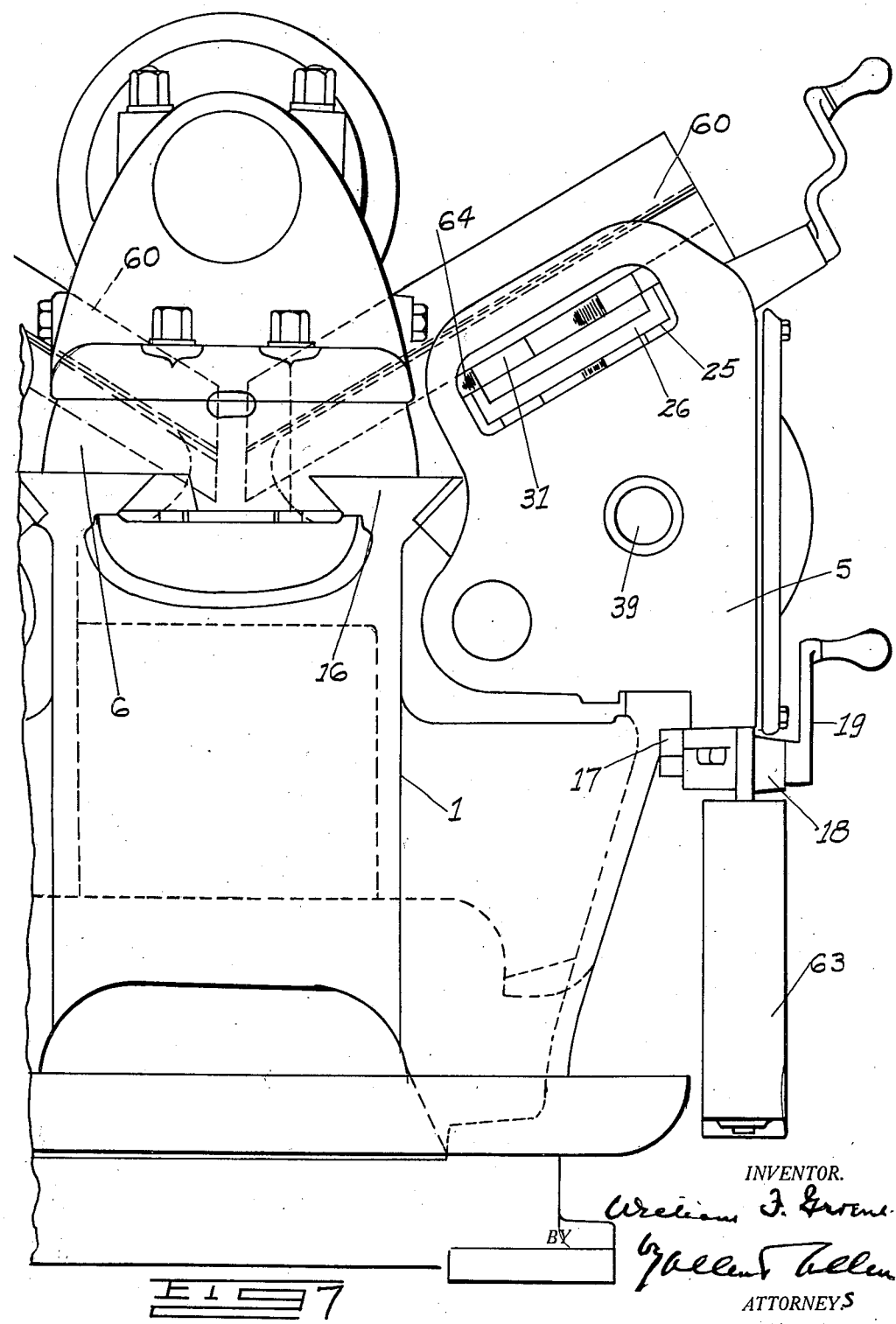

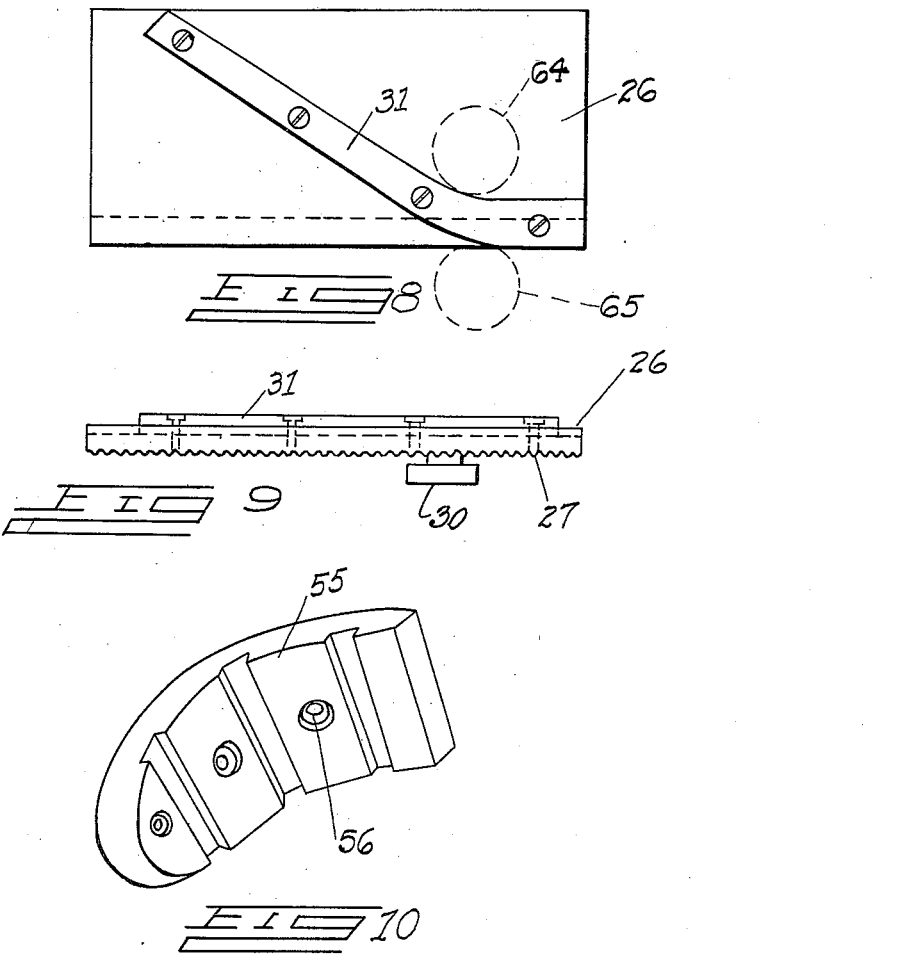

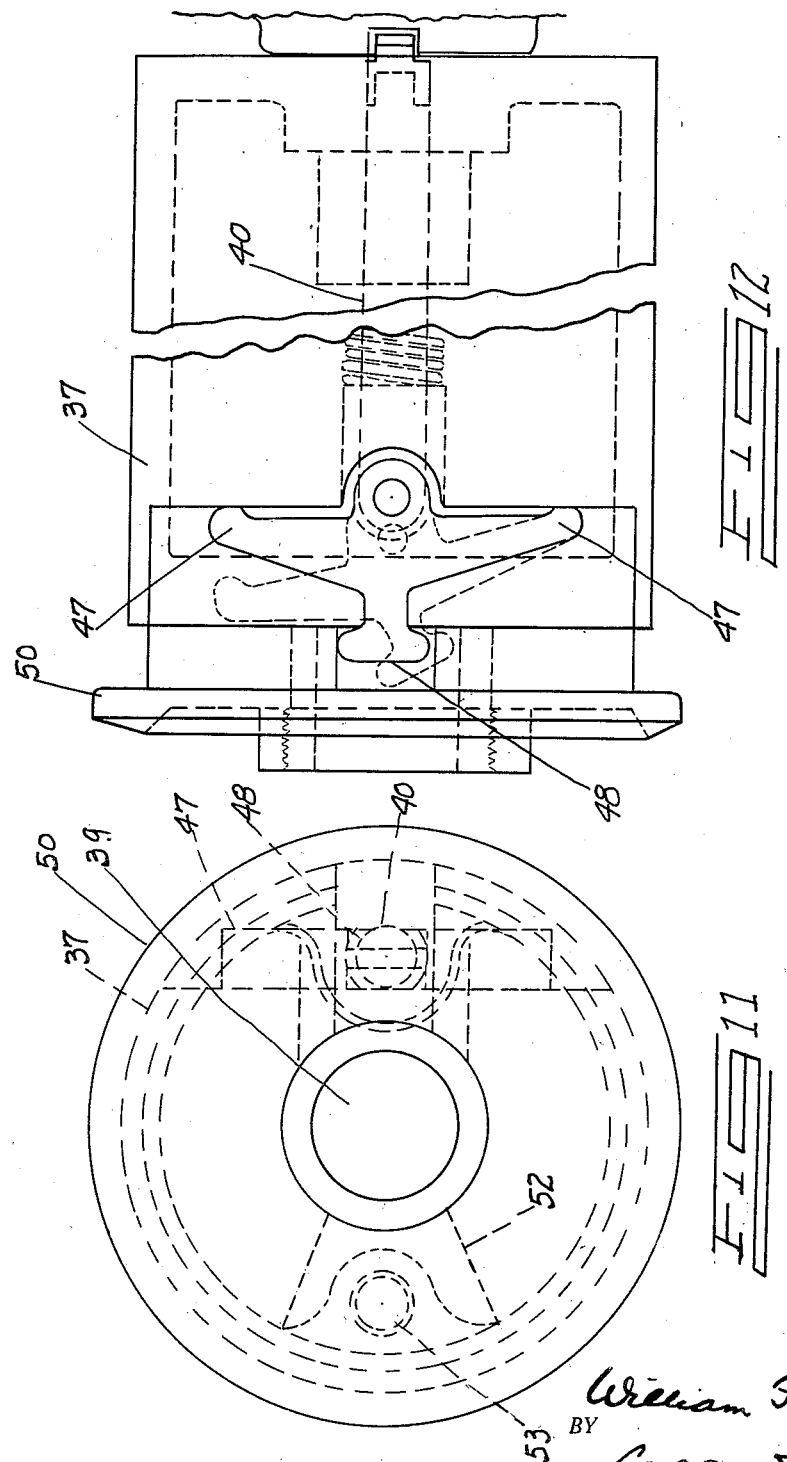

Aug. 11, 1931.   W. F. GROENE   1,818,128
AUTOMATIC LATHE
Filed Aug. 12, 1926   9 Sheets-Sheet 9

INVENTOR.
William F. Groene
BY
ATTORNEYS

Patented Aug. 11, 1931

1,818,128

UNITED STATES PATENT OFFICE

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF DELAWARE

AUTOMATIC LATHE

Application filed August 12, 1926. Serial No. 128,818.

My invention relates to lathes in which both the carriage and the cross slide are actuated automatically, according to a predetermined setting in such a way, as to impart any desired path of movement to the tools, at varied rates of speed, depending upon the requirements.

Lathes of this general type have been produced hitherto, and it is my object to improve upon the structure and mode of operation of automatic lathes.

In my novel automatic lathe, the controls for the several automatic movements are carried by the carriages, and the carriages are preferably duplicated in reverse on opposite sides of the machine. The movements of the carriages and tools are imparted to them by means of cam pieces detachably secured to drums on the carriages, which drums are driven by splined shafts from the actuating mechanism of the lathe.

The structural arrangements are such that a very smooth and powerful action is applied to the working tools, and such that the cycle of movement of either carriage is independent of where its starting point along the frame of the machine may be.

An improvement in my invention consists in provision for a very simple mechanism, whereby the operator may insert a hand crank after stopping the actuating mechanism and back out the cross slides from any position they may be found to be in.

The mode of actuation of the cross slides is such that there is a double engagement of the driven element, thereby preventing any back lash or chattering of the tools in the slides.

The adjustments will permit a very wide and diversified range of movement, so that the tools will feed in desired paths through a complete cycle from starting position, through a working path in straight or curved lines, and back to starting position again, with the tools feeding in any desired path relative to the carriages, and the carriages moving back and forth along the frame for any desired length of movement, and with relation to any desired part of the work.

Various advantages in my novel structure and improvements over prior mechanisms for like purpose will be pointed out as the description proceeds, in which I will set forth in detail one preferred embodiment of my invention, the novelty inherent, in which invention I will state in the appended claims.

In the drawings:

Figure 1 is a side elevation of the machine.

Figure 2 is a top plan view thereof.

Figure 3 is an end elevation of the machine.

Figure 4 is a cross section of the machine, showing one carriage in section and the other in elevation.

Figure 5 is a longitudinal section taken through the machine with the tail stock end in elevation.

Figure 6 is a larger scale section, taken vertically and longitudinally through one of the carriages.

Figure 7 is an enlarged end elevation of one side of the frame and a carriage, taken from the tail stock end.

Figure 8 is a plan view detail of the form plate and form bar.

Figure 9 is a side elevation of the device shown in Figure 8.

Figure 10 is a perspective of one of the drum cams.

Figure 11 is a detail elevation of the device for clutching and unclutching the cam drum.

Figure 12 is an elevation of the end view thereof.

Figure 13:
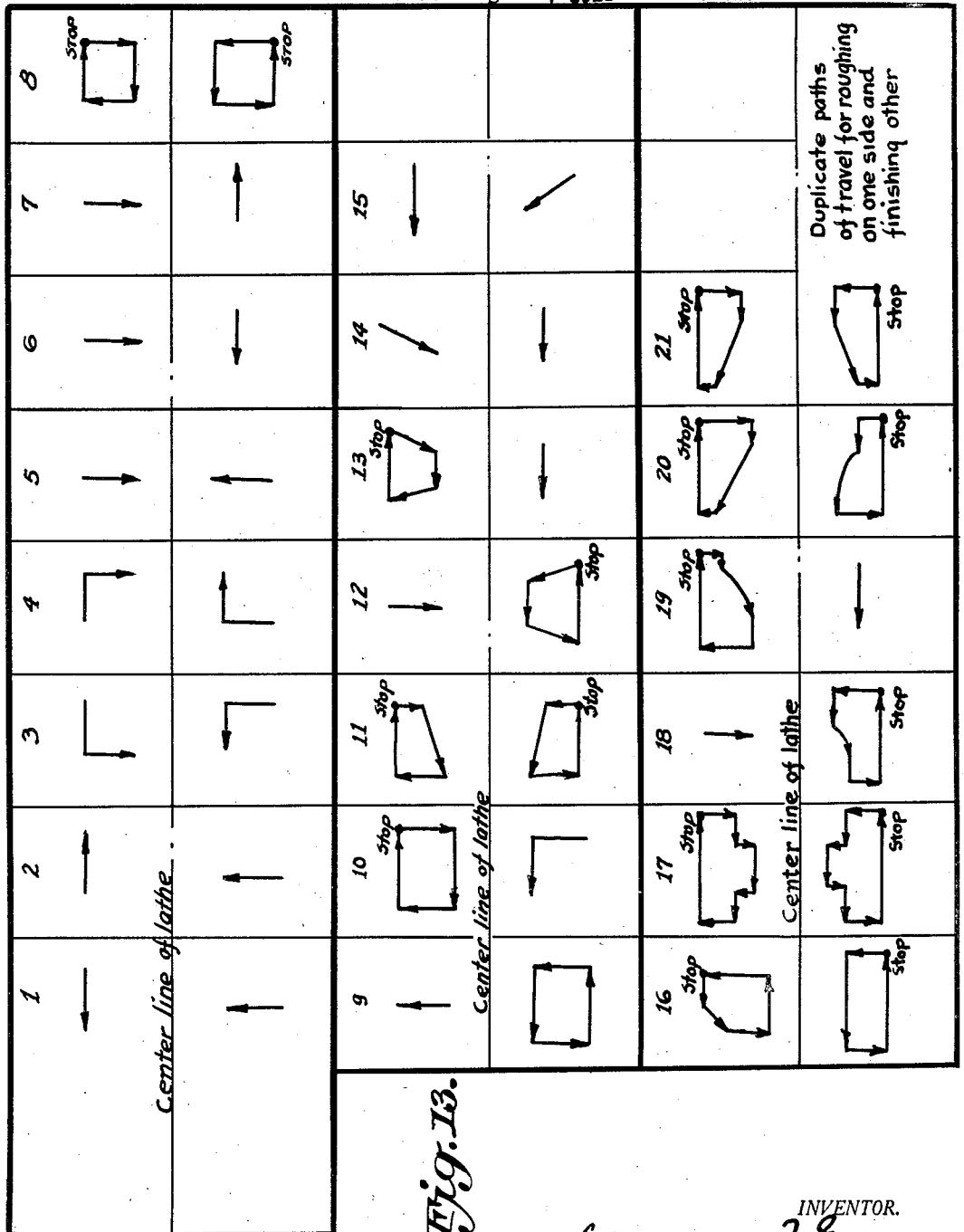
Figure 13 is a composite set of diagrams illustrating some of the movements which can be accomplished with this machine.

The machine is illustrated generally in Figures 1 and 2, as having a bed 1, a drive at 2, a head stock 3, and a tail stock 4. There are two carriages in the particular machine illustrated which are indicated generally at 5 and 6, one on each side of the machine. The carriages and all parts carried thereby and thereon, are actuated by means of splined shafts $5a$, and $6a$, which extend along the bed of the machine.

The drive for the machine has not been shown in detail, for the reason that this portion of the invention is not dependent upon the feed mechanism. It will be understood that the drive will be automatically controlled according to a predetermined setting, to revolve the work, and to drive the splined shafts slowly and rapidly during a cycle of operations from start to finish of a piece of work. The drive will be arranged to drive the splined shafts always in the same direction, so that no reversing mechanism is called for to back the tools out of the work and return them to starting position.

In general, the mode of operation which I will describe in detail, includes the provision of a drum on each carriage, which is driven by a set of gears also mounted in each carriage. The splined shafts energize the gearing on each carriage, through which gearing the drums are revolved one complete revolution for each cycle of operation. Each carriage is fed along the bed by hand, to a predetermined starting position, and a contact element is mounted on the bed, for each carriage, which engages some of the cams on the drum of its carriage, thereby resulting in forcing the carriage to and fro on the frame.

Each carriage supports a cross slide, and a form plate beneath the slide, on which is a form bar that moves the slide in and out, as the plate is moved to and fro. To move the plates to and fro, they are provided with contact rollers that engage other cams on the drums.

Thus, the movement of the tools in and out, can be controlled by the nature of the drum cams and form bars to move the cross slides in any irregular or regular motion, and the movement of the tools to and fro can be controlled by the cams on the drums that engage the frame abutments resulting in forcing the carriages to and fro. The in and out and sidewise movements, can be timed in any predetermined way, and the setting of the driving mechanism will naturally be such as to shift from rapid to slow movement when the tools are brought close to the work, and shift back to rapid movement when the tools are ready to leave the work, which rapid movement will bring the parts back to a starting position again, whereupon the drive will come to a stop, while another piece of work is inserted.

Both sides of the machine can do the same work, or different work, and the limit in the movements is dependent upon the size of the drums, and the possible effective angles of the cams thereon. Normally the drive for the one carriage will be on the opposite end thereof from the drive on the other, so that both splined shafts can be revolved in the same direction and the carriages and tool slides will feed toward the work and along the work at the same periods of a cycle of operations.

Very briefly referring to the drive, the main drive pulley 8, is mounted on the spindle 9, (Fig. 3) and transfers its power to a rapid traverse pulley 10, (Fig. 5) on spindle 11, by means of a belt 12. The rapid traverse pulley drives through a set of gearing as controlled by a clutch 13, the exterior of a ball ratchet gear, the interior of which is driven by the regular work feed so that when the rapid feed operates, the balls slip so as to free the slow drive, which can stay in operation during the operation of the rapid traverse driving action. (The two pulleys are omitted in Fig. 3.)

This form of gearing is not novel of itself, and detailed description is not included herein.

The automatic control structure is housed in the case 13a, and work, and rapid traverse feed control handles are mounted at 14, 14, and 15, 15, on the two sides of the machine so as to be operable from either side.

The bed 1 has ways 16 thereon, on which the two carriages slide. Along the face of the bed on each side is set a rack bar 17, and the carriages have sockets 18, through which a mover handle or crank can be inserted, as shown at 19, said crank having a toothed end to engage the rack bar. By means of such a crank each carriage can be moved along the bed to whatever position is desired.

Mounted on the bed, in selected holes 20, along the face of the rack bar portion thereof for each side of the device, are the abutment plates 21, which are slotted at 22, to receive the bolts 23. The abutment plates carry rollers 24.

The carriage, to describe one of them, since both are the same, is formed with slideways 25, in the base of the inwardly slanting upper portion thereof, on which rests a form bar plate 26. This plate has a toothed edge 27 to form a rack, and the boss 28 of the carriage, forms a journal for insertion and retention of a hand crank 29, having a gear toothed end to engage the rack. The crank can thus be used to move the form bar plate by hand.

The form bar plate is shown as formed of two pieces of metal secured together, although it could be made as one piece. It carries an abutment roller 30, which depends into the carriage, and also carries a form bar such as is indicated at 31, said bar being mounted in position by screws, and being built particularly for a given piece of work to be done.

The function of the cam drum in each carriage is to move the abutment roller 30 and act against the roller 24, thus moving the form bar and the carriage through a predetermined path controlled by the nature of the cams on the drum.

I have not illustrated fully the gearing carried by the carriages. It will suffice to note that the splined shaft 5a, for the carriage 5, enters a spline grooved gear 32 in the gear box portion of the carriage. This gear is prevented from movement except with the carriage, by means of pinned sleeves 33 and 34, that serve to journal its rather long hub 35.

The gear, by its rotation with the splined shaft, drives through a train of reduction gearing 36, a pinion 36a, that rotates the main gear 38 for the drum.

The cam drum 37 is mounted on a shaft 39, held within the carriage, on which the gear 38 is loosely mounted, and there is a clutching device to engage the gear 38 and the drum, so that the latter will be driven.

This mechanism consists of a shaft or rod 40, mounted in bosses 41 and 42, in the drum, and having a spring 43 around it, that engages the enlarged head end 44 thereof. This head end has a tip 45, which will be termed the driving dog, the arrangement being such that under the influence of the spring, the dog is forced to engagement in a socket 46 in the gear 38.

At the opposite end from the driving dog, the shaft is pivotally secured to a cross head having two arms 47, and a central button or head 48. The ends of the arms engage the end 49 of the drum and the button lies in a socket in a bevelled gear 50, which is loose on the end of the drum journal 51. The gear has also a socket 52 with divergent walls which lies over a pin or stud 53, set in the end wall of the drum, and by means of which the gear will drive the drum.

In a boss in the carriage, may be inserted a crank 54, which has a bevelled pinion at its end, so that the crank may be used to revolve the bevelled gear.

In no matter what position the drum and its cam may be with relation to the several abutments, when the operator attempts to drive the bevelled gear, the first movement will be to rock the button, on the end of the driving dog shaft. This will take place before the gear engages the pin 53, because of the divergent walled socket in the gear that engages this pin.

The result of rocking the button is to force one or the other arms of the cross head to be lifted from its seat on the end of the drum, which seat is enforced by the spring, on the driving dog shaft. As illustrated in Figure 12, this rocking of the cross head will pull the driving dog shaft into a position with the driving dog removed from driving position in the gear 38 at the other end of the drum.

By the time the dog is pulled out, the pin 53 will be engaged and the bevelled gear will rotate the drum in whatever direction of movement desired, since the cross head will tip in either direction.

When the handle is withdrawn, the bevelled gear will assume a position with the stud 53 midway of the socket which engages it as illustrated in Figure 11, since the spring on the driving dog shaft tends to return the cross head to the position shown in full lines in Figure 12.

Should the machine get jammed during its automatic operation, the operator will stop the driving mechanism, and can then back the drum, away from cam engagement in either direction, so as to get at the tools.

Were the clutching and unclutching of the drive to the drums so arranged that the operator had to get directly at the driving dog, this might be impractical, because the drum might be so turned at the moment of jamming of the tools, or other emergency, that the dog was not available.

By the structure described, it is possible to manually move the drums free of the driving mechanism thereof, in any position which they may assume.

The drums 37, one for each carriage, are formed in a ribbed nature with screw holes 54, into which the screws that secure the cams in place are engaged. A typical cam 55, is shown in Figure 10, having a curved body to fit the drum, and having screw holes 56 therein, by means of which it is held to the drum.

There may, for example, be two cams 55 on the drum to strike the abutment roller 34, thereby forcing the carriage say to the right, when the first cam strikes the roller, and back to the left again when the second cam strikes it.

There will also be cams 56 on the revolving drum for the abutment roller 30, depending from the form bar plate, which will, independent of whether the carriage is moving or not strike the plate first to the right, and then back to the left again.

Depending upon the shape of the two cams, the movements can be precontrolled, and the splined shafts and drums always driven in the same direction, and at the same speed.

Referring finally to the cross slides on the carriages, the slides are shown at 60, and as guided in ways 61 extending at a slant and crosswise of the direction of movement of the carriages.

Each cross slide will preferably have cables or chains 62 attached thereto, which pass out through the carriage and are secured to counterbalance weights 63, which provide an added element in preserving a perfectly smooth action of the cross slides.

Mounted on a fixed stud 63 in each cross slide, is an abutment roller 64 for the form bar that is to move the slide. The form bar is also engaged by another roller 65, which is adjusted to give a snug grip of the form bar between rollers. This roller is set on a plate 66, which slides in a dovetail groove or ways formed in the cross slide on its under face. In order to lock the plate 66 in position, each slide is equipped with a screw 67, which is screwed into the body of the cross slide, above the ways, but the head of which engages the plate or bar 66, thereby holding its roller up against the form bar.

When the form bar plate is moved to and fro across the carriage, the form bar will thrust the cross slide in and out of the work. The action will be quite smooth, and highly resistant to chattering, since there is a roller on each side of the form bar, one of which is engaged by a screw device, as described to force it up against the form bar, and the other of which is held against the form bar by the counterbalance weight.

When the form bar plate is moved in one direction, the cross slide is thrust toward the work, and when it moves in the other direction, the cross slide is moved away from the work. Both cross slides may be made to work together, or in any other desired relation. The movements of the cross slides are independent of the movement of the carriages, and the carriages independent of the movement of the cross slides. The actuating mechanism always travels in the same direction, and can be timed to impart rapid traverse back to starting position by means of an overrunning gear construction familiar in machine tools, automobile self-starters and the like. The carriages may be in any position on the frame, and the cross slides may be located anywhere transversely to the carriages.

The whole mechanism is carried by each carriage, by means of which that carriage and its cross slide are operated, from which it results that as many carriages on both sides of the machine, as it may be feasible to use, can be employed.

Certain of the movements in my novel machine are highly valuable by themselves in automatic lathes independent of others, and to that end I have described the mechanism completely, so as to cover all of the movements, without showing machines in the drawings from which certain of the movements are eliminated.

I have not attempted to cover in the description, the equivalents to the mechanisms described, but will state the invention inherent in my several structures in the claims that follow.

In order to indicate the high value inherent in my machine I have shown the views of Figure 13. It will be remembered in connection with these diagrams that the cross slide may be moved or not moved, and so also with the carriage, or both may move at any desired feeding rates independent of the rate of movement of the cam drum to a large degree.

Thus in the first of the views the tool on one side is not being moved by the cross slide at all, while that on the other side of the center line of the lathe is being moved by means of the cross slide alone.

The opposite is true of the next one of the diagrams. The next two in the top row indicate different movements wherein the carriage or the cross slide is not given any return movement. The fifth of the views is a mere double cross slide movement with still carriage. The sixth shows the carriage moving in one direction only, on one side of the line of feed, while the seventh shows the carriage moving in the other direction, the cross slide being held without movement.

The eighth view shows two like movements through a square from start to stop, in which the carriages and cross slides both move but the timing is such that neither moves while the other is moving. The ninth and tenth views show the full movement on one side of the center of the lathe as in the eighth view but the opposite tool in each case is moving through only part of its possible movement, during the working period from start to stop. In the eleventh diagram there is one variant in each side of the lathe over the eighth diagram in that the cross slide and carriage are both moving through part of the cycle giving a slanting straight line path.

In the twelfth and thirteenth diagrams the carriage is moving during both cross slide movements on one side of the lathe, this being shown alternately on opposite sides. The fourteenth and fifteenth views show access where there is no carriage return during the working cycle and on one side or the other the cross slide is operating simultaneously with the carriage.

The sixteenth view shows a composite of diagrams similar to ones shown previously but in a different arrangement. The seventeenth view shows opposite like movement where the carriage moves to a given point and the cam drum then holds this position while the cross slide works in, the carriage then moves while the cross slide stays still, and then opposite takes place on the return movement in the working cycle. In the eighteenth and nineteenth views there is shown the result of certain cam shapes by means of which the cross slide moving together with the carriage transcribes a curved path as part of the cycle. The twentieth view shows a like structure. The twenty-first view is the opposite of the eleventh.

In machines of the automatic lathe type, it is not practical in any constructions with which I am familiar to accomplish so varied and comprehensive a series of selective movements, and by locating the several drives on the carriages themselves and providing automatic control means, there is practically no movement which an operator would do by hand which cannot be duplicated automatically by my machine.

Having thus described my invention, what I claim as new and desire to secure by Letters Patent, is:—

1. In a lathe, a frame, a carriage movable thereon, a cam element on the carriage, means for driving said cam element, a form bar plate mounted to slide under influence of the cam element in the direction of movement of the carriage, a cross slide on the carriage, and a form bar on the plate engaging said cross slide.

2. In a lathe, the combination with the carriage, and cross slide thereon, of a form bar, means for actuating the form bar with relation to the carriage, and means on the cross slide engaging said form bar on both sides thereof, whereby the cross slide is moved with relation to the carriage, said cross slide having a counterweight tending to hold it outwardly against the form bar.

3. In a lathe, the combination with the carriage, and cross slide thereon, of a form bar, means for actuating the form bar with relation to the carriage, and means on the cross slide engaging said form bar on both sides thereof, whereby the cross slide is moved with relation to the carriage, one of said means being fixed, and the other adjustable so as to firmly engage the form bar.

4. In a lathe, the combination with the carriage, and cross slide thereon, of a form bar, means for actuating the form bar with relation to the carriage, and means on the cross slide engaging said form bar on both sides thereof, whereby the cross slide is moved with relation to the carriage, one of said means being fixed, and the other adjustable so as to firmly engage the form bar, and a counterweight secured to the cross slide and holding the fixed one of said means against the form bar.

5. In a lathe, a frame, a carriage movable thereon, a cross slide on the carriage, a movable plate having actuating means to move it in a reciprocatory path with relation to the carriage, and cam means on the plate and engaging the cross slide to move the slide on the carriage, said plate having a toothed rack in connection therewith, whereby engagement with a toothed implement will feed the rack, and hence the plate and cross slide.

6. In a lathe, a frame, a carriage movable thereon, a cross slide on the carriage, a cam drum on the carriage, means for driving said drum, independent of the position of the carriage on the frame, a cam on the drum for effecting the movement of the cross slide, and means on the drum for coupling and uncoupling it from the driving means.

7. In combination with a carriage of a lathe having a rotating cam device thereon for feeding operations, of driven means on the carriage for operating said device, and a movable member on the device for engaging said driven means, said member being operable from a single point on the carriage at any position of the device.

8. In combination with a carriage of a lathe having a rotating cam device thereon for feeding operations, of driven means on the carriage for operating said device, and a clutching element movable lengthwise of the cam device for engaging said driven means, a rocking member pivotally secured to the said element, and rotary means on the carriage having engagement with the rocking member to tilt it sufficiently to move the element out of clutching position.

9. In combination with a carriage of a lathe having a rotating cam device thereon for feeding operations, of driven means on the carriage for operating said device, and a clutching element movable lengthwise of the cam device for engaging said driven means, a rocking member pivotally secured to the said element, and rotary means on the carriage having engagement with the rocking member to tilt it sufficiently to move the element out of clutching position, said cam device having an abutment engaged by the rotary means when the same has been moved sufficiently to release the clutching element, whereby rotation of said rotary means will uncouple the drive from the cam device and move the cam device independently thereof.

10. In a lathe, a frame, a carriage movable thereon, a cross slide on the carriage, a cam drum on the carriage, means for driving said drum, independent of the position of the carriage on the frame, a cam on the drum for effecting the movement of the cross slide, and means on the drum for coupling and uncoupling it from the driving means, comprising a driving connector movable lengthwise of the drum, and having pivotal connection with a rocking head, a gear engageable by a tool, and having a socket to engage said head to rock it, and thus move the connector out of driving position, and a stud on the drum engaging said gear when same has been moved sufficiently to rock the head.

11. A clutching and unclutching device for cam drums in lathes and the like comprising in combination with a drum, a driver therefor, a rod having a dog to engage the driver, said rod being mounted slidably on the drum, a head pivotally secured to the rod and having arms to engage the end of the drum, and rotary means axial with the drum and having a socket to engage said head, thereby tilting one of said arms and drawing the rod so as to release the dog.

12. A clutching and unclutching device for cam drums in lathes and the like comprising in combination with a drum, a driver therefor, a rod having a dog to engage the driver, said rod being mounted slidably on the drum, a head pivotally secured to the rod and having arms to engage the end of the drum, and rotary means axial with the drum and having a socket to engage said head, thereby tilting one of said arms and drawing the rod so as to release the dog, said rotary means formed as a gear whereby it may be driven by a suitable tool.

13. A clutching and unclutching device for cam drums in lathes and the like comprising in combination with a drum, a driver therefor, a rod having a dog to engage the driver, said rod being mounted slidably on the drum, a head pivotally secured to the rod and having arms to engage the end of the drum, and rotary means axial with the drum and having a socket to engage said head, thereby tilting one of said arms and drawing the rod so as to release the dog, said rotary means formed as a gear whereby it may be driven by a suitable tool, a wide socket in the gear, and a stud on the drum, set to engage the socket when the gear has been moved in either direction to tilt said head.

14. In a lathe, a carriage, a cross slide thereon, a form bar for actuating the cross slide, a rotating cam element on the carriage and means on the form bar actuated by said cam element.

15. In a lathe, a carriage, a cross slide thereon, a form bar for actuating the cross slide, a rotating cam element on the carriage and means on the form bar actuated by said cam element, a fixed frame member and rotating cam element on the carriage engaging the frame member.

WILLIAM F. GROENE.